United States Patent

Kirschner

[11] Patent Number: 5,652,635
[45] Date of Patent: Jul. 29, 1997

[54] DECORATIVE EYEGLASSES

[76] Inventor: Mitchell Kirschner, 7235 Creveling Dr., St. Louis, Mo. 63130

[21] Appl. No.: 651,271

[22] Filed: May 23, 1996

[51] Int. Cl.⁶ .............................. G02C 11/02; G02C 5/14
[52] U.S. Cl. ........................... 351/52; 351/51; 351/121
[58] Field of Search ..................... 351/51, 52, 111, 351/118, 119, 113, 115, 116, 121, 122, 123, 158, 41

[56] References Cited

U.S. PATENT DOCUMENTS

| | | |
|---|---|---|
| 1,919,731 | 7/1933 | Kates . |
| 3,133,141 | 5/1964 | Anderson . |
| 3,667,834 | 6/1972 | Davison et al. . |
| 4,564,272 | 1/1986 | Kan . |
| 5,185,620 | 2/1993 | Cooper ................................ 351/113 |
| 5,321,442 | 6/1994 | Albanese . |

*Primary Examiner*—Hung X. Dang
*Attorney, Agent, or Firm*—Polster, Lieder, Woodruff & Lucchesi, L.C.

[57] ABSTRACT

Eyeglasses having a lens-carrying frame and temple pieces mounted to the lens-carrying frame, the temple pieces including a temple block hinged to the frame, ear pieces, and, between the block and the ear pieces, a segment mounted on the hinge block, but rotatably mounted with respect to the frame. The rotatable section can be made in various shapes, or imprinted with various different decorations on different sides, or made varicolored.

14 Claims, 4 Drawing Sheets

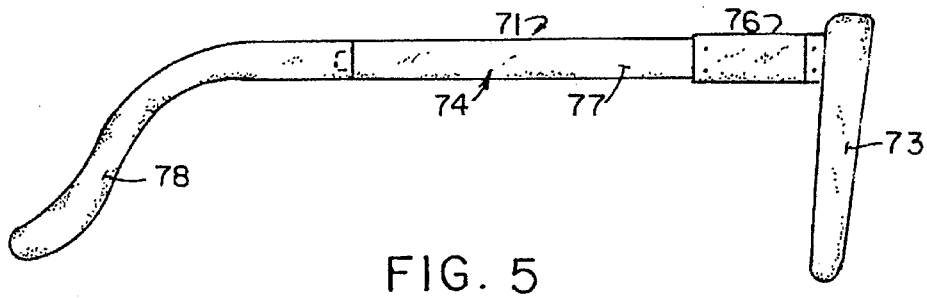
FIG. 5
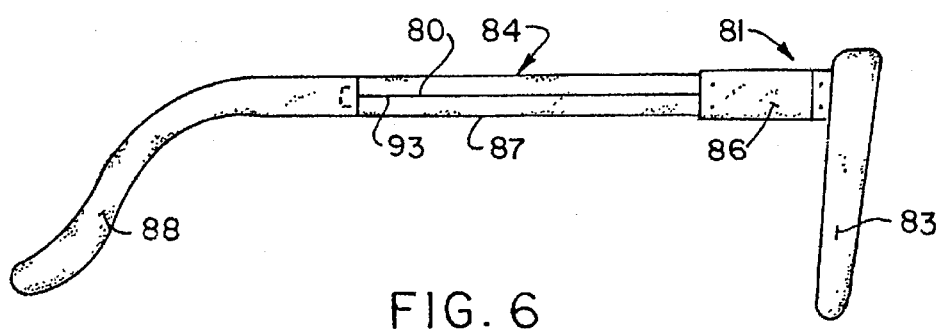
FIG. 6
    
FIG. 7A    FIG. 7B    FIG. 7C    FIG. 7D    FIG. 7E
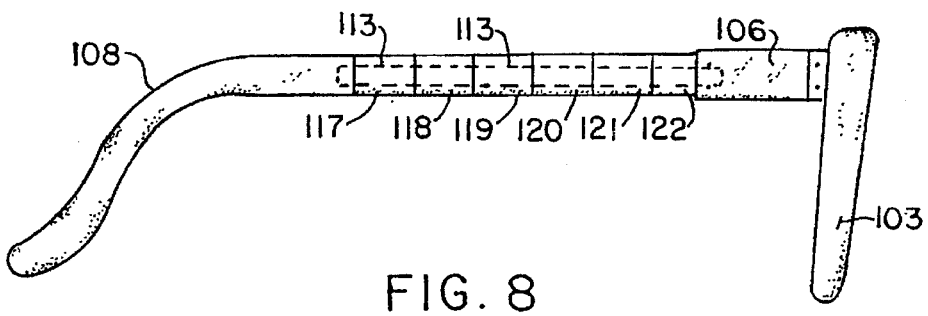
FIG. 8
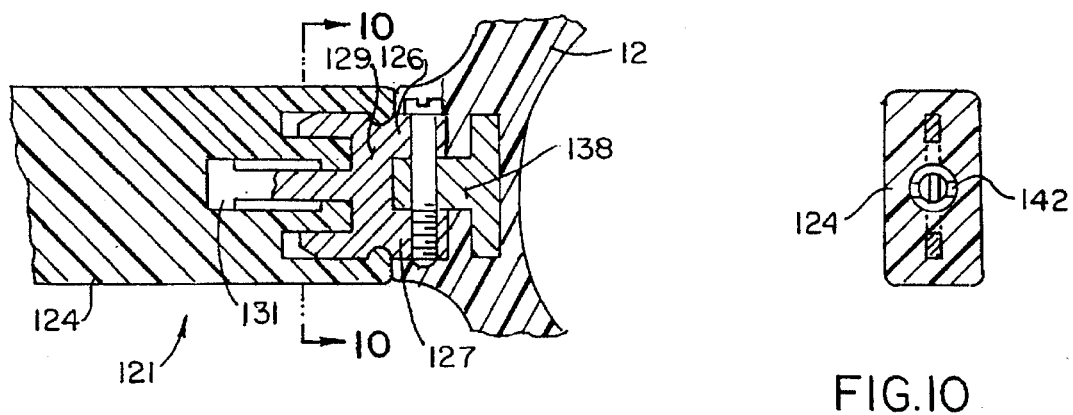
FIG. 9
FIG. 10

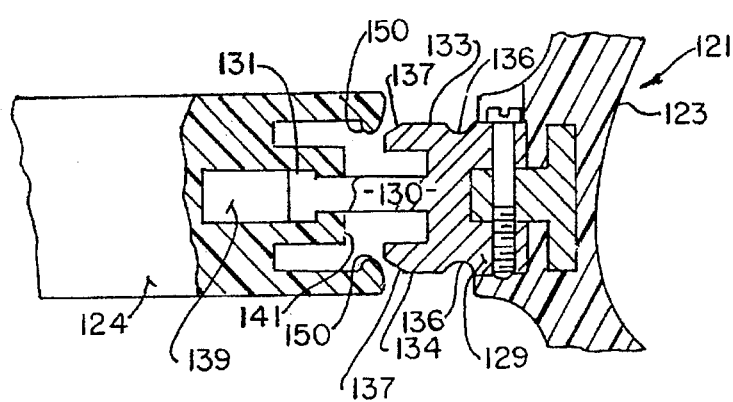

DECORATIVE EYEGLASSES

BACKGROUND OF THE INVENTION

Eyeglasses with temple pieces the configuration, color or design of which can be changed have been suggested heretofore. Albanese, U.S. Pat. No. 5,321,442, discloses glasses with ear pieces that are removable and a sleeve 8 that can be snapped onto or slipped from the side over a frame temple piece 4. Shaw, U.S. Pat. No. 4,848,889, discloses means for decorating the lens-holding frame rather than the temple pieces, by forming the frame as a hollow tube into which flexible colored members can be inserted. It is clear from Albanese that the ornaments display only one aspect. If more than one ornamental side piece were desired, a piece not in use would have to be stored somewhere or discarded.

One of the objects of this invention is to provide eyeglasses with temple pieces the appearance of which can be changed by simple manipulation of the temple pieces. Other objects will become apparent to those skilled in the art in the light of the following description and accompanying drawing.

SUMMARY OF THE INVENTION

In accordance with this invention, generally stated, in an eyeglass having a lens-carrying frame and temple pieces, the temple pieces being mounted at one end of the frame and having a head-engaging part at another end, segments of at least one of the temple pieces are rotatable with respect to the lens-carrying frame, the segments carrying indicia, generally integral with the segments. In the preferred embodiments, the rotatable segments are held positively to inhibit their unintended rotation.

IN THE DRAWINGS

In the drawing, FIG. 1 is a view in perspective of a pair of glasses illustrating temple pieces of this invention;

FIG. 5 is a view in side elevation of a third embodiment of this invention;

FIG. 6 is a view in side elevation illustrating a fourth embodiment of this invention;

FIGS. 7A through 7E are transverse sectional views of temple pieces adapted to use with the embodiments shown in FIGS. 2, 4, 5, 6, 8, 12, 14, and 21;

FIG. 8 is a view in side elevation of a fifth embodiment of this invention;

FIG. 9 is a fragmentary longitudinal view of a sixth embodiment of this invention;

FIG. 10 is a sectional view taken along the line 10—10 of FIG. 9;

FIG. 11 is a fragmentary view in side elevation of the device shown in FIGS. 9 and 10 in a position at which the temple piece can be rotated;

FIG. 12 is a fragmentary top plan view of a eyeglass of the embodiment shown in FIGS. 9 through 11;

FIG. 13 is a fragmentary view in side elevation, partly broken away, of a hinge block and temple piece of a seventh embodiment of eyeglass of this invention;

FIG. 14 is a fragmentary top plan view of the hinge block and temple piece of FIG. 13, hinged to an eyeglass lens-holding frame;

FIG. 15 is a sectional view taken along the line 15—15 of FIG. 13;

FIG. 16 is a fragmentary view, partly broken away of the end of the temple piece of FIG. 13 contiguous the hinge block;

FIG. 17 is a view in end elevation of the temple piec of FIGS. 13-16:

FIG. 18 is a view in front elevation of the hinge block of FIG. 13;

Figure 20:
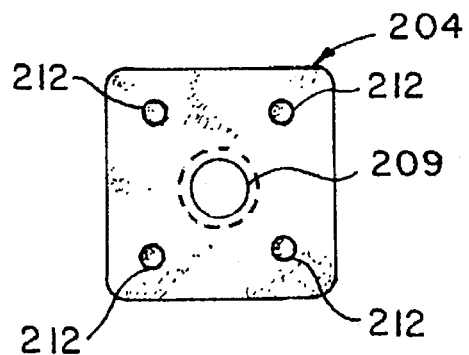
Figure 21:
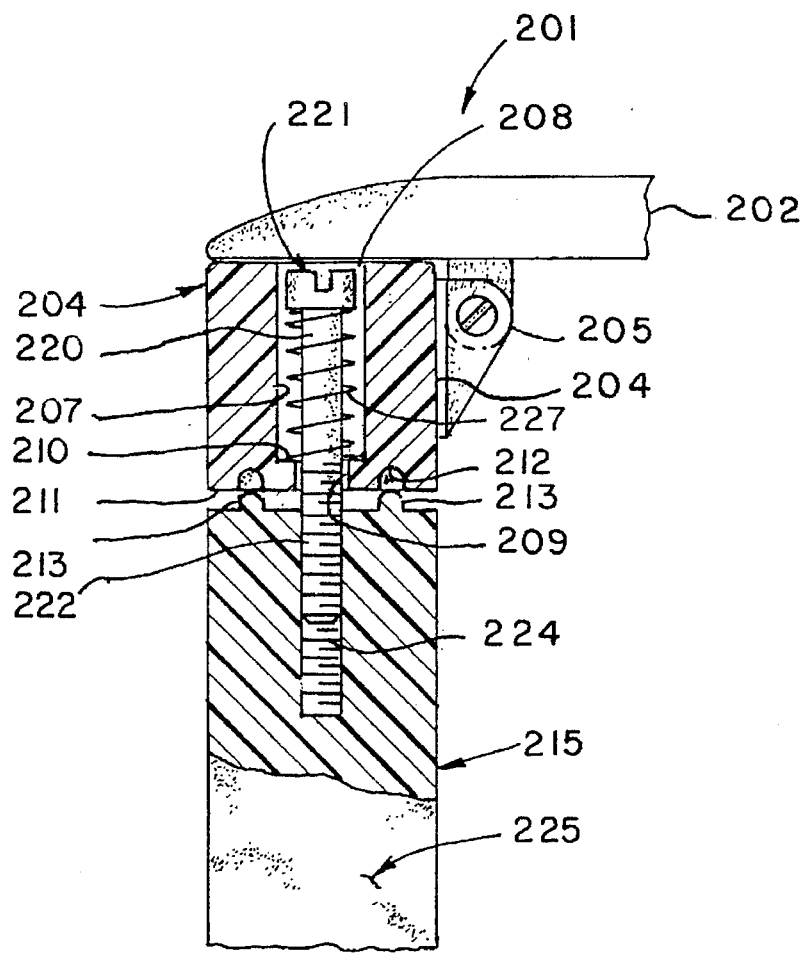

FIG. 19 if a view in side elevation of a partly assembled hinge block of FIG. 18;

FIG. 20 is a view in front elevation of a hinge block of an eighth embodiment of eyeglass of this invention; and FIG. 21 is a fragmentary top plan view of an eyeglass incorporating the hinge block of FIG. 20.

DESCRIPTION OF THE PREFERRED EMBODIMENT

Figure 1:
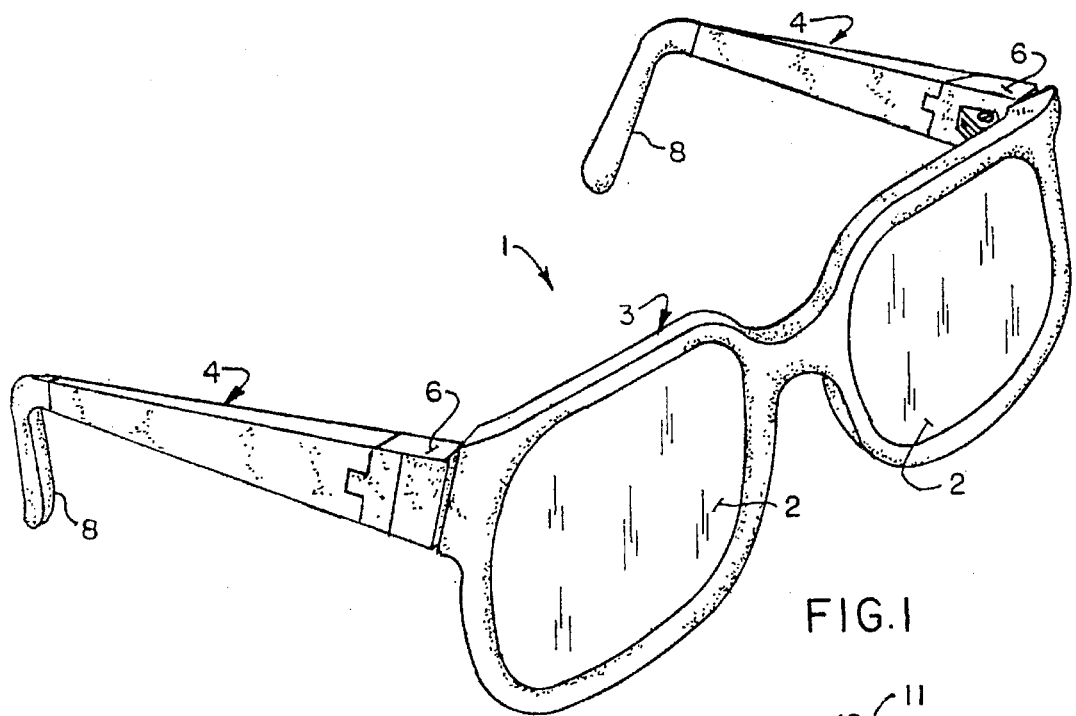

Referring now to FIGS. 1 through 4, reference numeral 1 indicates a pair of eyeglasses, which can be sunglasses, safety glasses, ordinary corrective lens-type glasses or any combination of these. The glasses 1 have a frame 3, in which lenses 2 are mounted, temple pieces 4, and ear pieces 8. In the embodiments shown in FIGS. 1–8, the temple pieces 4 include a hinge block 6, which is hinged, in a conventional way, to the frame 3 at one end of the hinge block, one illustrative example of which is shown in FIG. 1. A face of the hinge block abuts the frame 3, in a conventional way, to limit the outward rotation of the temple pieces with respect to the frame. A surface of the hinge block generally parallel to the frame-abutting face, faces a surface of a rotatable segment of the temple pieces.

Figure 2:
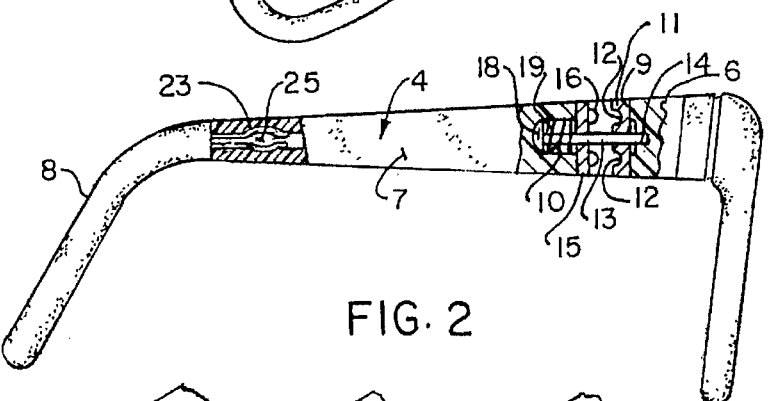
FIG. 2 is a view in side elevation, partly broken away and partly in section, of one embodiment of the eyeglasses of this invention.

Referring now to FIG. 2 for one illustrative embodiment of this invention, the hinge block 6 has on a surface 9 facing a rotatable segment 7 of the temple piece 4, a face plate 11, in an outer surface of which are dimples 12. The face plate 11 has a passage through a central part, through which a pin 13 extends. An outer end 13 of the pin 13 is fixed in the hinge block 6. At an inner end of the pin 13, the pin carries a head 18. The head end of the pin is mounted in a socket or well 10 in an end of the rotatable segment 7 of the temple piece along with a helical compression spring 19, caged between an underside of the head 18 and an inner surface of a temple segment plate 15 secured to the section 7. The temple segment plate 15 has projections 16 complementary to the dimples 12, in both size and location. The length of the spring 19 is such as to permit the rotatable segment 7 of the temple piece 4 to be retracted as shown in FIG. 2, and permitted to be biased by the spring into a position at which the projections 16 seat in the dimples 9, thus restraining the rotatable segment 7 from accidental rotation.

It can be seen that if the segment 7 is rotated through 180°, the side of the temple piece 4 that was exposed exteriorly, will then be contiguous the temples of the wearer. In this embodiment, the ear pieces 8 will also be rotated. Accordingly, it is necessary to make the ear pieces orientable into the position shown in FIG. 2, regardless of which side of the rotatable segment 7 is exposed. To this end, a cavity 25 is provided in the end of the rotatable segment 7 farthest from the frame, and the ear pieces 8 are provided with snap prongs 23 which are selectively manually pushed into and pulled from the cavity 25.

Figure 4:
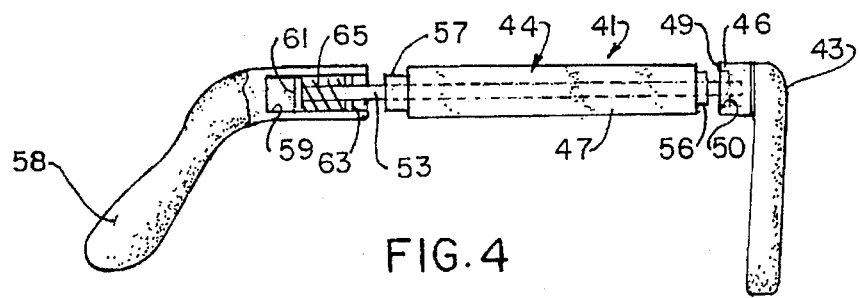
FIG. 4 is a view in side elevation, partly broken away and partly in section, of a second embodiment of this invention.

In the embodiment shown in FIG. 4, eyeglasses 41 have a frame 43, temples 44 and ear pieces 58. A temple block 46 is hingedly mounted on the frame 43. In this embodiment, a rod 53 is anchored at one end in the block 46, and, at its other end, is provided with a head 61. A rotatable segment 47 is rotatably mounted on the rod 53. The rotatable segment 47 has at its end adjacent the ear piece a square socket or mortise 59 in the ear piece, a square tenon 57 of a size and shape complementary to inside surfaces of walls defining the socket 59, so as to seat within the socket 59. At its other end, the rotating segment 47 has on it a tenon 56 which is shaped and sized complementarily to a socket, mortise or well 50 in the hinge block 46. A spring 65 is mounted on the rod 53 within the socket 59, and is caged between an under surface of the head 61 and an inner surface of an annular stop 63 that is press fitted or otherwise securely mounted within the socket 59.

In this, second, embodiment, as can be seen from FIG. 4, when the rotatable segment 47 is to be rotated, the eye piece 58 is pulled manually, against the bias of the spring, away from the frame 43 until the tenons 56 and 57 have cleared the "mortises" 50 and 59, when the segment 47 can be rotated on the rod 53. When the ear piece 8 is released, the spring 65 biases the ear piece into engagement with the rotating segment 47, and the rotating segment 47 into engagement with the hinge block 46, the rotatable segment being oriented so that the tenons are seated in the mortises, thus preventing further rotation of the segment 47 and also of the ear piece 58, until the ear piece is again retracted.

Figures 3A, 3B, 3C, 3D, 3E:
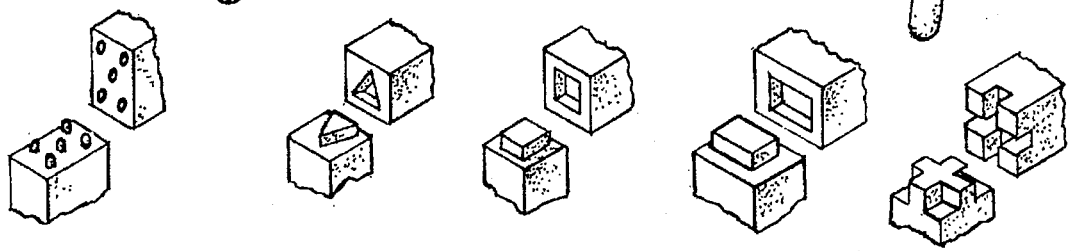
FIGS. 3A through 3E illustrate various forms of rotation inhibiting or preventing means.

Referring now to FIGS. 3A, B, C, D and E, some of the various forms of mortise and tenon configurations that can be used, with simple modification, with the embodiments of either FIG. 2 or FIG. 4, are illustrated. FIG. 1 illustrates yet another form, in which a tongue and groove arrangement is used to accomplish the same object, in the case of the glasses shown in FIG. 1, the tongue being provided on the hinge block 6 and the groove in the rotating segment of the temple piece 4. The locking devices shown in FIGS. 3A through 3E allow for different degrees of rotation: the rectangular arrangement of FIG. 3A permitting only two positions, at 180° from one another, the triangular arrangement of FIG. 3B permitting three degrees of rotation, 120° apart, the square tenon of FIG. 3C permitting four degrees, 90° from one another, the rectangular mortise and tenon of FIG. 3D permitting two degrees of rotation, and the cruciform mortise and tenon arrangement of FIG. 3E permitting four. It will be apparent that only the form shown in FIGS. 1, 3A and 3D will be useable with the two-sided rotatable segment of the embodiment shown in FIGS. 1 and 2; all of the arrangements can be used with the rotatable segment 47 of the embodiment shown in FIG. 4, depending upon the cross-sectional configuration of the rotatable temple segment 47. Thus, if the segment 47 has a configuration as shown in FIG. 7B, it can accommodate the mortise and tenon shown in FIG. 3B; if a configuration shown in FIGS. 7C or 7E, it can accommodate the configurations of mortise and tenon shown in FIGS. 3C and 3E. These, however, are merely illustrative.

Referring now to FIG. 5, a pair of eyeglasses 71, with a frame 73, has temples 74, with hinge blocks 76, each with a rotatable segment 77, and ear pieces 78. The embodiment shown in FIG. 5 is similar to that shown in FIG. 2, except that the rotatable segment 77 can be given any of the cross-sectional configurations shown in FIGS. 7A through 7E, the mortise and tenon arrangement being appropriate to the particular configuration. The securing and releasing mechanism can be that of either of the embodiments shown in FIGS. 1 and 2.

In FIG. 6, eyeglasses 81 are shown, with a frame 83, temples 84, hinge blocks 86 and a rotatable segment 87. This embodiment corresponds to the embodiment shown in FIG. 4, with a rod 93, shown somewhat schematically.

Referring now to FIG. 8, eyeglasses 101 are shown as having a frame 103, hinge blocks 106, ear pieces 108, and a rod 113. Rotatably mounted on the rod 113 are a series of segments 117, 118, 119, 120, 121 and 122, all independently rotatable, and all having some form of rotation inhibiting structure at each end, complementarily shaped and sized with respect to a contiguous piece, thereby providing a multiple combination of surfaces.

Referring now to FIGS. 9 through 12 for yet another embodiment eyeglass of this invention, reference numeral 121 indicates the eyeglass of this embodiment, with a frame 123 and a rotatable temple piece 124. The temple piece is mounted to the frame by means of a hinge 125, a central knuckle 138 of which has a part embedded in the frame. Upper and lower knuckles 126 and 127 are formed integral with a leaf 129. The leaf 129 has a center prong 130 with a Tee head 131. An upper prong 133 is spaced above the center prong 130 and a lower prong 134 is spaced below the center prong 130. In each of the upper and lower prongs, on the outer side of the prong, is a recess 136. At the free end of the prongs 133 and 134, each is chamfered as shown at 137.

At the hinge end of the rotatable temple piece 124, is a central cavity or blind passage 139, with a radially inwardly extending interrupted rim 141, interrupted diametrically by a transverse slot 142 through it, the slot being perpendicular to the plane defined by the leaf 129. Outboard of the cavity 139, an upper prong-receiving channel 144 and a lower prong receiving channel 145 are positioned, when the temple piece is properly oriented, to receive the prongs 133 and 134 respectively. Channels 144 and 145 are defined in part by upper flexible wall 147 and lower flexible wall 149. Each of the flexible walls 147 and 149 has at its free end a downwardly extending rib 150, sized and positioned to snap into the recesses 136.

The temple piece 124 can be mounted on the central prong 130 by turning it at right angles to its normal position, and slipping the Tee head 131 through the slot 132 into the central cavity 139. The temple piece 124 can then be oriented in its proper position as shown in FIGS. 9 through 12, and pushed toward the frame 123. The ribs 150 will be cammed outwardly by the chamfers 137, to permit them to ride over a flat surface of the prongs, until the ribs snap into the recesses 136. To rotate the temple pieces through 180°, is only necessary to pull the temple piece until the ribs 150 are cammed out of the recesses 136 and the temple pieces brought to the position shown in FIG. 11, when it can be turned and pushed back into place. As with most of the rest of the eyeglasses described, the construction of the eyeglasses of this embodiment can be modified to accommodate three or four degrees of rotation.

The ear piece of the temple can be made as shown in either FIG. 2 or FIG. 4, for example, to be properly oriented.

Referring to FIGS. 13–19, for yet another embodiment of this invention, eyeglasses 161 have a hinge 162, which can be similar to the hinges in the embodiments described heretofore. A hinge block 164 in this embodiment has two cavities, a first cavity 166 and a second cavity 170. The first cavity is defined by an end wall 167 contiguous the hinge, a side wall 168, an intermediate wall 169, a top wall 171, a bottom wall 172, and a plate 190. The second cavity 170 shares the intermediate wall, side wall 168, top and bottom walls 171 and 172, and plate 190. Ribs 173 depend from and extend along a free edge of the top and bottom walls 171 and 172, forming a restricted mouth of the second cavity. The intermediate wall has in it a shaft passage 174, through which a central shaft 184 of a temple piece 175 extends. In this case, the shaft 184 is in the form of a bolt with a head 185 and a threaded shaft that screws into an internally threaded hole in the temple piece 175, as shown in FIG. 13.

The temple piece 175 in this embodiment is four sided. It has a head end 177 with a neck 179 and shoulders 180. The head end 177 is slotted to define four flexible fingers 178, spaced from and surrounding the central shaft 184, as shown in FIG. 13. The neck 179 defines top grooves or seats 181, bottom grooves or seats 182 and side grooves or seats 183. The grooves are shaped and sized complementarily to the ribs 173. The head 177 is square in front elevation, and the second cavity is shaped and proportioned complementarily to the head.

The shaft 184 has a spring 187 mounted around the shaft, caged between the head 185 and a surface of the intermediate wall 169.

In assembling the temple piece to the hinge block of this embodiment, the hinge block is made as it appears in FIG. 13. The temple piece is simply installed from the open side as shown, and the plate 190 is bonded to the surfaces of the end, top, bottom and intermediate walls.

The temple piece 175 can be pulled from the second cavity 170 by virtue of the flexing of the fingers 178, against the bias of the spring 187, until the head has cleared the mouth of the cavity. The temple piece can then be rotated through any desired increment of 90°, and snapped back into the cavity 170.

It can be seen that by changing the configuration of the temple piece and cavity 170, other configurations, either thinly rectangular for a two sided display, triangular, for a three sided display, or otherwise polygonal can be used. The spring 187 can be omitted.

Referring to FIGS. 20 and 21 for yet another embodiment of this invention, eyeglasses 201 have a tense-holding frame 202, a hinge 205 and a hinge block 204 connected to a leaf of the hinge 205. The hinge block of 204 has a passage 207 extending from one end of the block to the other. The passage 207 has an open end 208 at the end of the block contiguous the frame 202 and the temple piece is in the position shown in FIG. 21, and a more restricted opening 209 at its other end, has an annular shoulder 210. An outer surface 211 of the hinge block has in it dimples 212, arranged symmetrically about the opening 209. In the illustrative embodiment shown, a temple piece 225, with a threaded bolt hole 224 has on a surface facing the outer surface 211, a series of projections 213 shaped and positioned to complementary to the dimples 212. A bolt 220, with a head 221 and a shank 222 threaded through at least the lower third of the shank has a helical spring 227 mounted on it between the head 221 and the shoulder 210, and is screwed into the threaded hold 224 to the degree of compression desired. If it is desired, for example, to preclude the rotation of the temple piece 225 it can be screwed down until the spring is compressed tightly against the shoulder 210. Ordinarily, the compression of the spring 227 is just enough to prevent accidental rotation of the temple piece. It can be seen that any number of dimples 212 can be provided, and one or more projections 213, which would permit a multiplicity of positions of the temple piece, if that were desired. In the embodiment shown, the temple piece 225 is square in cross section and the number oath of the dimples of the projections is four. This embodiment is the simplest of the constructions, and is readily manufactured.

Numerous variations in the construction of the eyeglass construction of this invention, within the scope of the appended claims, will occur to those skilled in the art in the light of the foregoing disclosure. In all of the embodiments, the rotatable segments of the temple pieces are indicia-carrying members. The indicia can be different materials, such as plastics, metals or wood, colors, shapes, graphic images, photographs, logos, trademarks, cartoons, or any other decorative feature, uniquely different on two or more surfaces. The temple pieces need not be retractable a substantial distance, particularly in the embodiments shown in FIGS. 2, 4, and 21, where one or more spring loaded detents can be used, set into either the hinge block or the rotatable temple piece, in the case of the embodiment shown in FIG. 2, or the hinge block or eyepiece or both, or the rotatable temple piece, in the case of the embodiment shown in FIG. 4, in either case, with complementary dimples in the other member or members. Other detent means can be used, such as leaf springs or even resilient bumps made as part of the rotatable temple piece or hinge block, or ear piece as the case may be. If a head-engaging disc or the like is used, symmetrical with respect to the long axis of the temple piece, instead of the hook-shaped ear piece illustrated in connection with the illustrative embodiments, no provision for relative rotation of the head-engaging part with respect to the temple piece need be made. These are merely illustrative.

I claim:

1. In an eyeglass having a lens-carrying frame and temple pieces, said temple pieces being mounted at one end to said frame and having a head-engaging part at another end, the improvement comprising indicia-carrying means along at least one of said temple pieces intermediate said frame and said head-engaging part, said indicia-carrying means having discrete areas bearing different indicia, said indicia-carrying means being rotatable with respect to said frame, for displaying selectively one of a plurality of said indicia.

2. The improvement of claim 1 wherein said indicia carrying means is integral with a portion of said temple piece.

3. The improvement of claim 1 wherein the indicia are colors.

4. The improvement of claim 1 wherein the indicia are different materials.

5. The improvement of claim 1 wherein the indicia are different graphic images.

6. The improvement of claim 1 wherein the indicia are different shapes.

7. In an eyeglass having a lens-carrying frame and temple pieces, said temple pieces being mounted at one end to said frame and having a head-engaging part at another end, the improvement comprising indicia-carrying means along at least one of said temple pieces intermediate said frame and said head-engaging part, said indicia-carrying means having discrete areas bearing different indicia, said indicia-carrying means being rotatable with respect to said frame, for displaying selectively one of a plurality of said indicia, said temple piece including a rod fixed at one end in a block hinged to said frame, said indicia-carrying means being a segment rotatably mounted on said rod and said rotatable segment having means for holding said indicia-carrying means in a selected orientation against rotation.

8. In an eyeglass having a lens-carrying frame and temple pieces, said temple pieces being mounted at one end to said frame and having a head-engaging part at another end, the improvement comprising indicia-carrying means along at least one of said temple pieces intermediate said frame and said head-engaging part, said indicia-carrying means having discrete areas bearing different indicia, said indicia-carrying means being rotatable with respect to said frame, for displaying selectively one of a plurality of said indicia, said indicia-carrying means comprising a plurality of independently rotatable segments.

9. The improvement of claim 8 wherein said indicia-carrying means are rotatably mounted on a rod anchored in a temple block hinged to said frame, and each of said segments carries means for holding said segment in a selected orientation with respect to a contiguous segment.

10. In an eyeglass having a lens-carrying frame and temple pieces, said temple pieces being mounted at one end to said frame and having a head-engaging part at another end, the improvement comprising indicia-carrying means along at least one of said temple pieces intermediate said frame and said head-engaging part, said indicia-carrying means having discrete areas bearing different indicia, said indicia-carrying means being rotatable with respect to said frame, for displaying selectively one of a plurality of said indicia, a hinge between said temple piece and said frame, said hinge having first knuckle means mounted to said frame and second knuckle means having a leaf with a central prong member with a head, and outer prong members spaced from said central prong member and parallel therewith, said temple piece having a central, central prong-receiving cavity and upper and lower outer prong-receiving cavities, and flexible walls defining a surface of said upper and lower prong-receiving cavities, said outer prong members each having a recess and said flexible walls having an inwardly extending rib adapted to fit into said recess.

11. In an eyeglass having a lens-carrying frame and temple pieces, said temple pieces being mounted at one end to said frame and having a head-engaging part at another end, the improvement comprising said temple pieces having a plurality of lengthwise extending surfaces angularly related to one another and carrying different indicia intermediate said frame and said head-engaging part, said temple pieces being rotatably mounted to and with respect to said frame, for displaying selectively said indicia.

12. In an eyeglass having a lens-carrying frame and temple pieces, said temple pieces being mounted at one end to said frame and having a head-engaging part at another end, the improvement comprising said temple pieces having a plurality of lengthwise extending surfaces angularly related to one another and carrying different indicia intermediate said frame and said head-engaging part, said temple pieces being rotatably mounted to and with respect to said frame, for displaying selectively said indicia, and means positively restraining said temple pieces against accidental rotation.

13. An eyeglass having a lens-carrying frame, a hinge block hinged to said frame and a temple piece rotatably mounted at one end to said hinge block and having a head-engaging part at another end, said hinge block having a passage with a shoulder around a restricted portion of said passage, a bolt with a head and a shank at least a portion of which is threaded and a helical spring mounted on said shank and caged between said head and said shoulder, said shank being threaded into an internally threaded hole in said temple piece whereby said temple piece is mounted to said hinge block, complementary means on said temple piece and said hinge block for holding said temple piece in selected orientation with respect to said hinge block and indicia along surfaces of said temple piece intermediate said frame and said head-engaging part, said indicia being displayed selectively with different orientations of said temple piece with respect to said hinge block.

14. An eyeglass having a lens-carrying frame, a hinge block hinged to said frame and a temple piece rotatably mounted at one end to said hinge block and having a head-engaging part at another end, one of said temple piece and said hinge block having a passage with a shoulder around a restricted portion of said passage, mounting means having a head and a shank, said head being positioned within said passage and said shank extending through said restricted portion and being mounted in the one of said hinge block and said temple piece in which the head is not mounted, whereby said temple piece is mounted to said hinge block, said head being spaced from said shoulder a distance to permit retraction of said temple piece from said hinge block and its rotation about said shaft with respect to said hinge block, complementary means on said temple piece and said hinge block for holding said temple piece in selected orientation with respect to said hinge block and indicia along surfaces of said temple piece intermediate said frame and said head-engaging part, said indicia being displayed selectively with different orientations of said temple piece with respect to said hinge block.

* * * * *